(12) United States Patent
Bower, III

(10) Patent No.: US 7,051,331 B2
(45) Date of Patent: May 23, 2006

(54) METHODS AND APPARATUS FOR MONITORING A LOWER PRIORITY PROCESS BY A HIGHER PRIORITY PROCESS

(75) Inventor: Fred A. Bower, III, Hillsboro, OR (US)

(73) Assignee: International Business Machines Corporation, Armonk, NY (US)

(*) Notice: Subject to any disclaimer, the term of this patent is extended or adjusted under 35 U.S.C. 154(b) by 832 days.

(21) Appl. No.: 10/040,130

(22) Filed: Jan. 2, 2002

(65) Prior Publication Data
US 2003/0126302 A1    Jul. 3, 2003

(51) Int. Cl.
*G06F 9/48* (2006.01)

(52) U.S. Cl. .................................. 718/107; 714/25

(58) Field of Classification Search ........ 719/310–332; 714/100, 1–57; 718/107, 108
See application file for complete search history.

(56) References Cited

U.S. PATENT DOCUMENTS

| | | | | |
|---|---|---|---|---|
| 5,440,726 A * | 8/1995 | Fuchs et al. | ................... | 714/20 |
| 5,748,882 A * | 5/1998 | Huang | ........................... | 714/47 |
| 5,938,775 A * | 8/1999 | Damani et al. | ................ | 714/15 |
| 6,145,089 A * | 11/2000 | Le et al. | .......................... | 714/4 |
| 6,246,666 B1 * | 6/2001 | Purcell et al. | ............... | 370/221 |
| 6,523,139 B1 * | 2/2003 | Banning et al. | ............... | 714/43 |
| 6,567,937 B1 * | 5/2003 | Flores et al. | ................... | 714/46 |
| 6,654,801 B1 * | 11/2003 | Mann et al. | ................. | 709/224 |
| 6,678,369 B1 * | 1/2004 | DeMent et al. | ......... | 379/221.03 |
| 6,687,847 B1 * | 2/2004 | Aguilera et al. | ............... | 714/4 |
| 6,782,496 B1 * | 8/2004 | Fleming | ....................... | 714/55 |
| 6,789,114 B1 * | 9/2004 | Garg et al. | .................. | 709/224 |
| 6,820,221 B1 * | 11/2004 | Fleming | ....................... | 714/31 |

FOREIGN PATENT DOCUMENTS

WO    WO 98/27753    *    6/1998

OTHER PUBLICATIONS

Southwest Research Institute. "Common Software Model Deployment Initiative System Design Document, Version 1.0." Jan. 14, 1999.*
Felber, Pascal et al. "Failure Detectors as First Class Objects." IEEE. 1999.*
Robertson, Alan. "Linux—HA Heartbeat System Design." ALS 2000.*
Wikipedia encyclopedia entry for Computer Multitasking, http://en.wikipedia.org, last updated 2005.

* cited by examiner

Primary Examiner—Lewis A. Bullock, Jr.
(74) Attorney, Agent, or Firm—Abdy Raissinia

(57) ABSTRACT

The monitoring of a worker process by an executive process. A worker process periodically sends a signal to an executive process, such as via a call to a heartbeat interface, which receives the signal and determines whether the worker process is improperly functioning. If the worker process is improperly functioning, the executive process terminates the worker process. The executive process may also examine the worker process for diagnostic purposes before terminating, or returning control to, the worker process.

18 Claims, 5 Drawing Sheets

METHODS AND APPARATUS FOR MONITORING A LOWER PRIORITY PROCESS BY A HIGHER PRIORITY PROCESS

BACKGROUND OF THE INVENTION

1. Technical Field

This invention relates generally to worker processes that may be improperly or maliciously functioning, and more particularly to monitoring such worker processes by an executive process.

2. Description of the Prior Art

Modern computer systems typically have firmware, or other non-volatile memory. Firmware is generally a category of memory chips that hold their content without electrical power and include read-only memory (ROM), programmable ROM (PROM), erasable and programmable ROM (EPROM) and electrically erasable and programmable ROM (EEPROM) technologies. Firmware becomes "hard software" when holding program code. For example, in some computer systems, the firmware may include the basic input/output system (BIOS) of a system. The BIOS is a set of routines in a computer, which is stored on a chip and provides an interface between the operating system and the hardware. The BIOS supports all peripheral technologies and internal services, such as the real-time clock.

Within firmware and other computer operating environments, there generally exists a limited-functionality operating mode for performing hardware diagnostic testing, which is also known as performing diagnostics. Hardware diagnostic environments customarily are single-threaded environments without interrupt support, which means that the running process has complete control within the environment. Other processes cannot interrupt this process, and therefore it is difficult to monitor the running process. A limited solution is provided by a hardware counter that is commonly used by firmware programmers. The hardware counter is periodically incremented by the running process, so it can be determined that the running process is making progress in its diagnostic tests.

However, this approach still has disadvantages. While a process is running, it cannot be monitored except for its periodic incrementing of the hardware counter. The hardware counter serves only as a simplistic on or off flag indicating whether the process is functioning correctly. If the process functions improperly, either maliciously or because it has malfunctioned, only this fact is known. Examination of the process can be impossible, because if the operating environment locks up because of the improper functioning of the process, it usually must be turned off and back on, or otherwise reset, which results in erasing the remnants of the process in memory, such that it cannot be examined. For these described reasons, as well as other reasons, there is a need for the present invention.

SUMMARY OF THE INVENTION

The invention relates to the monitoring of a worker process by an executive process. In a method of the invention, a worker process sends a signal to an executive process, which receives the signal and determines whether the worker process is improperly functioning. If the worker process is improperly functioning, the executive process terminates the worker process.

An article of manufacture of the invention includes a computer-readable medium and means in the medium. The means is for receiving a call to a heartbeat interface from a process such that processor control is received from the process. The means is also for terminating the process in response to determining that the process is improperly functioning, and for returning the processor control back to the process in response to determining that the process is properly functioning.

A system of the invention includes an executive process and a worker process. The executive process has a heartbeat interface. The worker process periodically calls the heartbeat interface so that the executive process is able to determine whether the worker process is improperly functioning. Other features and advantages of the invention will become apparent from the following detailed description of the presently preferred embodiment of the invention, taken in conjunction with the accompanying drawings.

DESCRIPTION OF THE PREFERRED EMBODIMENT

Overview

Figure 1:
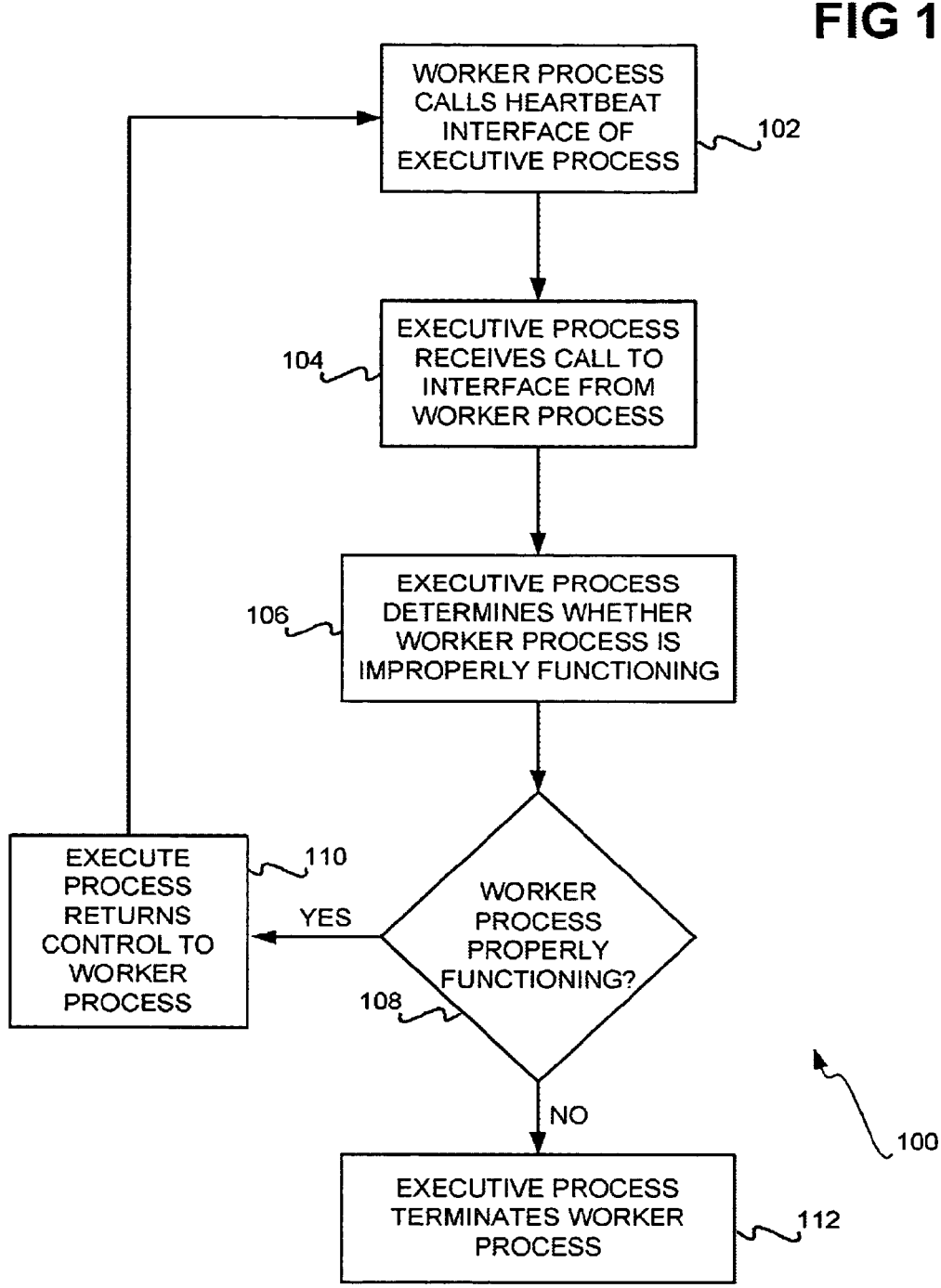
FIG. 1 is a flowchart of a method for an executive process to monitor a worker process, according a preferred embodiment of the invention, and is suggested for printing on the first page of the patent.

FIG. 1 shows a method 100 according to an embodiment of the invention. Like other methods of the invention, the method 100 can be implemented as means stored on a computer-readable medium of an article of manufacture. The computer-readable medium may be a recordable data storage medium, a modulated carrier signal, or another type of computer-readable medium.

The method 100 is performed by an executive process and a worker process, and can be performed within a firmware operating environment or another type of operating environment. An executive process is a process that has higher priority than a worker process, and thus a worker process is a process that has lower priority than an executive process. The operating environment may be a single-threaded environment that does not support interrupts, such that a process must willingly transfer processor control to another process. The worker process may be a diagnostic test process for the firmware, or another type of process.

Periodically, therefore, the worker process sends a signal to the executive process (102). The sending of this signal may be the calling of a heartbeat application programming interface (API) of the executive process by the worker process. More generally, the heartbeat API is a heartbeat interface of the executive process. By sending this signal to the executive process, the worker process transfers processor control to the executive process. The executive process thus receives the signal from the worker process (104), and has processor control, such that it can execute within the operating environment.

The executive process determines whether the worker process is improperly functioning (106). The worker process may be properly functioning, or it may be improperly functioning in a number of different manners. For example, the worker process may simply be malfunctioning, such that it is not consciously functioning as it should. As another example, the worker process may be maliciously functioning, such that it is consciously not functioning as it should.

In response to determining that the worker process is improperly functioning (108), the executive process terminates the worker process (112). Before or after terminating the worker process, the executive process may also perform diagnostic functionality aimed at assisting programmers to understand why the worker process was not properly functioning. For instance, the executive process may record a copy of the worker process in a storage, so that the worker process may be later examined.

If the worker process is functioning properly (108), the executive process ultimately returns processor control back to the worker process (110), such that the worker process again periodically sends a signal to the executive process in the future. The executive process may also increment a hardware heartbeat counter for the worker process. The executive process may also perform other functionality.

Technical Background

Figure 2:
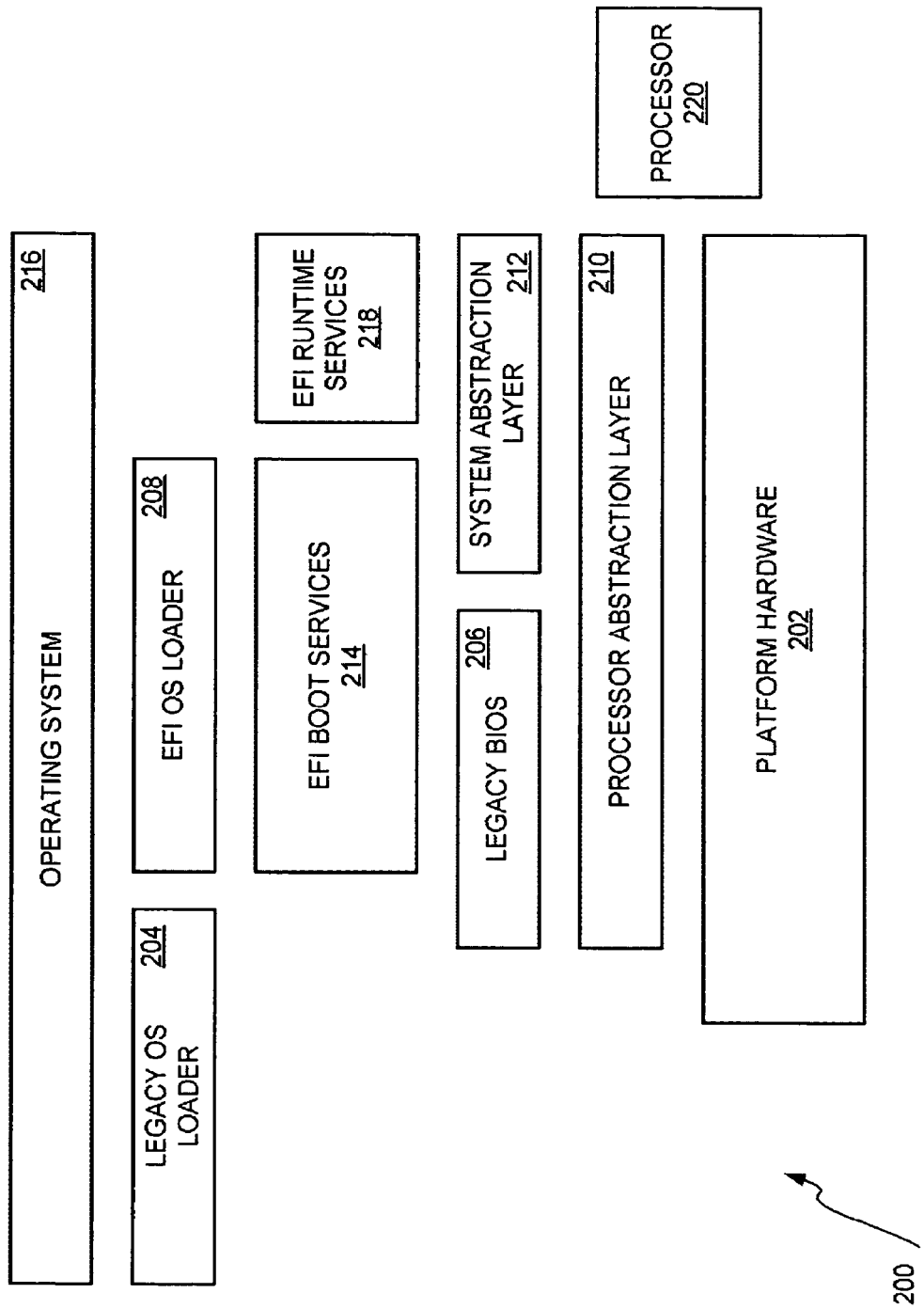
FIG. 2 is a diagram of a system architecture having firmware in conjunction with which embodiments of the invention may be implemented.

FIG. 2 shows an example architecture 200 in conjunction with which embodiments of the invention may be implemented. The architecture 200 is specifically that of the Intel Architecture (IA), which includes ITANIUM processors manufactured by Intel Corp., of Santa Clara, Calif. The invention itself may be implemented in conjunction with other architectures, however. The architecture 200 includes platform hardware 202 other than the processor 220, a processor abstraction layer (PAL) 210, a system abstraction layer (SAL) 212, and operating system (OS) software 216. The platform hardware 202 is the hardware on which the operating system 216 is running, except for the processor 220. The PAL 210 provides a consistent firmware interface to abstract processor implementation-specific features to the other components of the architecture 200. The SAL 212 isolates operating system and other higher-level software from implementation differences in the platform hardware 202.

The architecture 200 also includes a legacy OS loader 204, a legacy basic input/output system (BIOS) 206, an Extensible Firmware Interface (EFI) OS loader 208, EFI boot services 214, and EFI runtime services 218. The Extensible Firmware Interface (EFI) is that which has been promulgated by Intel Corp., of Santa Clara, Calif. The legacy OS loader 204 is present for the architecture 200 to be compatible with older computer systems that still include such a loader 204 for loading the OS 216. Similarly, the legacy BIOS 206 is present for the architecture 200 to be compatible with older computer systems that still include such BIOS 216. The EFI boot services 214 are the services that the EFI provides for booting the computer of which the architecture 200 is a part, whereas the EFI runtime services 218 are the services that the EFI provides after the OS software 216 has been loaded.

Figure 3:
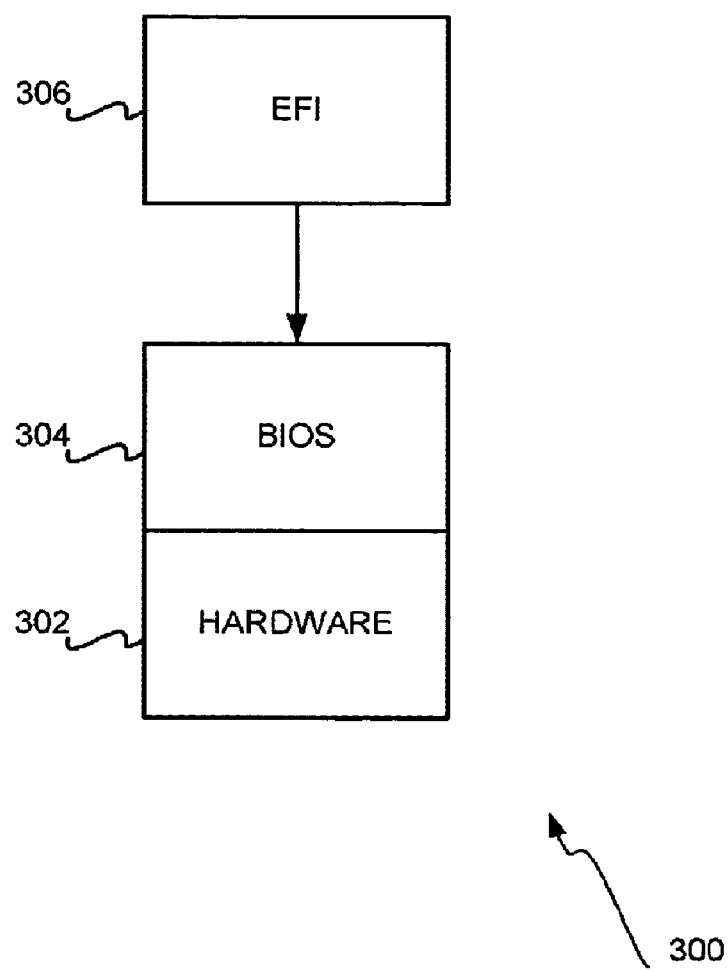
FIG. 3 is a diagram of another system architecture having firmware, that can be consistent with the system architecture of FIG. 2, in conjunction with which embodiments of the invention may be implemented.

FIG. 3 shows another view of an architecture 300 in conjunction with which embodiments of the invention can be implemented. The architecture 300 includes platform hardware 302, on top of which hardware-specific BIOS 304 is present, and that interacts with the hardware 302. The hardware 302 may be the hardware 202 of FIG. 2. The BIOS 304 may be the legacy BIOS 206 of FIG. 2. The EFI 306 thus abstracts the BIOS 304 from the OS, decoupling development. The EFI 306 is a polling-based, single-threaded firmware environment, which in a diagnostic mode does not support interrupts. The EFI 306 may be inclusive of the EFI boot services 214, the EFI runtime services 218, the SAL 212, and the PAL 210 of FIG. 2.

The EFI 306 allows for the creation of programs and driver programs. The former are resident in memory only while they execute, whereas the latter remain resident in memory until removed. More specifically, there are two types of driver programs: boot services drivers and runtime services drivers. The boot services drivers cease to exist when a call is made to an exit boot services API of the EFI, which is typically made by the OS loader, such as the OS loader 208 of FIG. 2. Runtime services drivers remain resident while the OS is running.

Executive Process Monitoring of Worker Process

Figure 4:
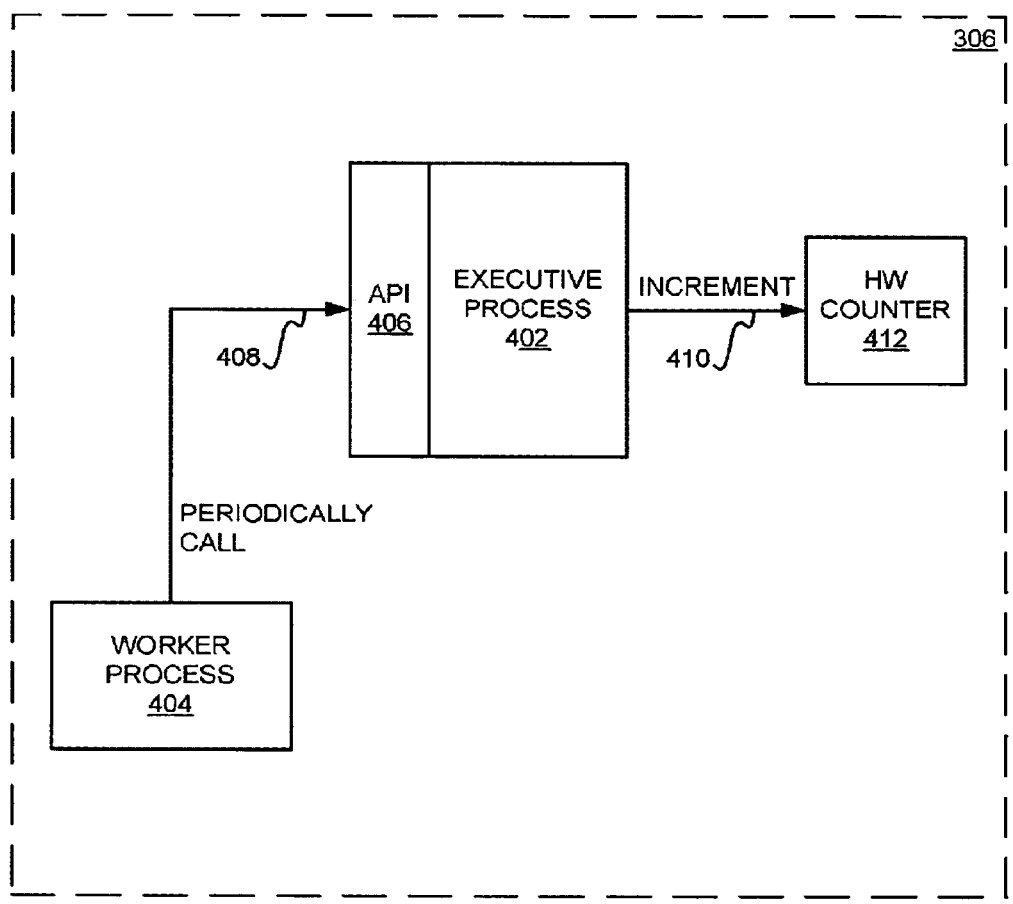
FIG. 4 is a diagram of an operating environment showing the functioning of an embodiment of the invention in which a worker process calls a heartbeat application programming interface (API) of an executive process, so the executive process is able to monitor functioning of the worker process. The embodiment of FIG. 4 is consistent with the embodiment of FIG. 1.

FIG. 4 shows the execution of an executive process 402 and a worker process 404 according to an embodiment of the invention. The execution is preferably within an operating environment afforded by the EFI 306 in at least a diagnostic mode of the EFI 306, as has been described. The executive process 402 and the worker process 404 may each be a driver program within the EFI 306, such that they remain resident in memory even when they are not functioning and do not have active processor control. Periodically, the worker process 404 calls a heartbeat API 406 of the executive process 402, as indicated by the arrow 408. The executive process 402 can then diagnose the worker process 404 to ensure that it is properly functioning. If it is, then the executive process 402 increments the hardware counter 412 for the worker process 404, as indicated by the arrow 410. That is, the API 406 of the executive processor 402 is inserted between the worker process 404 and the hardware counter 412, such that the worker process 404 periodically calls the API 406, in lieu of periodically incrementing the hardware counter 412.

Because the operating environment may be a single-threaded, interrupt-free environment, as has been described, the executive process 402 in such instances receives processor control from the worker process 404 only when the latter calls the API 406. That is, the executive process 402 may not be able to interrupt running of the worker process 404. However, at least while the worker process 404 is sufficiently functioning properly to call the API 406 of the executive process 402, the executive process 402 is able to monitor the functioning of the worker process 404. The executive process 402 may determine, for instance, that the worker process 404 is about to malfunction, such that it can be said that the worker processor 404 is not properly functioning. The executive process 402 may then terminate the worker process 404, and perform diagnostic measures relative to the worker process 404 as appropriate. If the worker process 404 is functioning, however, the executive process 402 returns process control back to the worker process 404.

Figure 5:
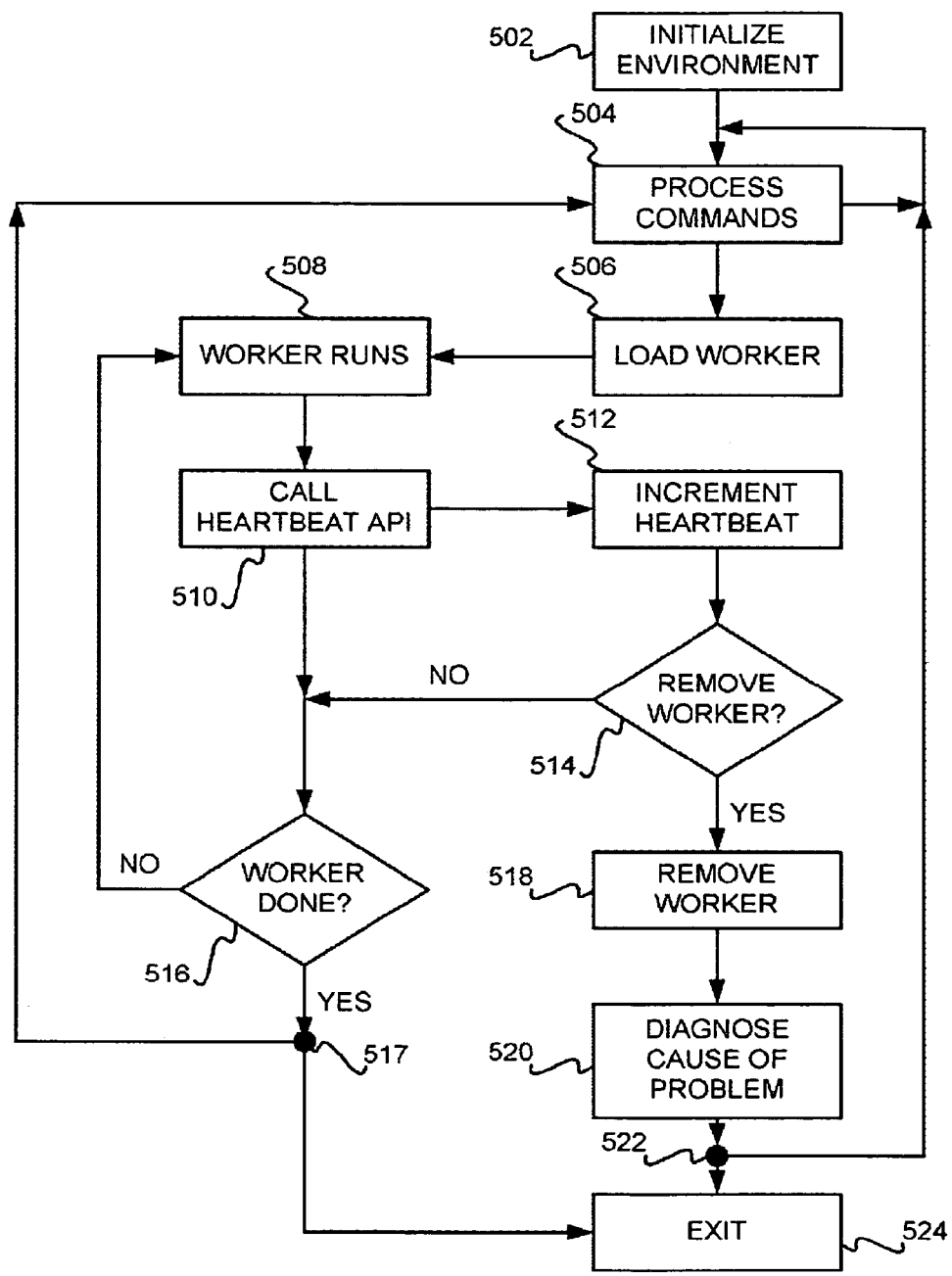
FIG. 5 is a flowchart of a method showing in more detail how an embodiment of the invention operates, such that an executive process is able to monitor functioning of a worker process. The embodiment of FIG. 5 is consistent with the embodiments of FIGS. 1 and 4.

FIG. 5 shows a method 500 that illustrates in detail the operation of an embodiment of the invention. The method 500 is consistent with the embodiments of FIG. 1 and FIG. 4 that have been described. A firmware diagnostic-mode operating environment is first initialized (502), and previously set commands indicating the type of diagnostic tests that should be run are processed by an executive process (504). The commands may indicate, for instance, which worker processes should be loaded and run to perform diagnostic tests. Thus, a worker process is loaded (506), and runs (508). Periodically, the worker process calls a heartbeat API of the executive process (510), which transfers process control to the executive process. The executive process increments the hardware heartbeat counter for the worker process (512), and then determines whether the worker process should be removed, or terminated (514).

If the worker process is properly functioning (514), then the worker process is not removed, and processor control reverts back to the worker process from the executive process. If the worker process is not finished with the diagnostic tests or other functionality (516), then it continues running (508). If the worker process is finished (516), however, then processor control again reverts back to the executive process. As indicated as the junction 517, the executive process either processes more commands in 504, or is finished, and exits the method 500 (524). If, however, the worker process is not properly functioning (514), then the worker process is removed or terminated by the executive process (518), and preferably the executive process diagnoses the reason why the worker process improperly functioned (520). As indicated as the junction 522, the executive process then either processes more commands in 504, or is finished, and exits the method 500 (524).

Advantages over the Prior Art

Embodiments of the invention allow for advantages over the prior art. Unlike the hardware counter-incrementation approach of the prior art, which does not provide for any diagnosis as to why a process is malfunctioning, the heartbeat API approach of the invention provides for such diagnosis. An executive process, when periodically called by a worker process, is able to assess whether the worker process is functioning properly. If the worker process is not functioning properly, the executive process can undertake a diagnosis as to why the worker process is not properly functioning, instead of just resetting the system, as may be the only option available within the prior art.

Alternative Embodiments

It will be appreciated that, although specific embodiments of the invention have been described herein for purposes of illustration, various modifications may be made without departing from the spirit and scope of the invention. For example, embodiments of the invention have been substantially described in relation to a firmware diagnostic-mode operating environment that is single-threaded and does not support interrupts. However, the invention may also be implemented in conjunction with other types of operating environments, including other types of firmware operating environments. Accordingly, the scope of protection of this invention is limited only by the following claims and their equivalents.

I claim:

1. A computer-implemented method comprising:
running of a worker process within a single-threaded, interrupt-free diagnostic mode of a firmware environment also including an executive process such that the worker process has processor control while running and such that the executive process is unable to interrupt running of the worker process and is unable to function unless and until the worker process transfers processor control to the executive process;
sending a signal from the worker process to the executive process, such that processor control transfers from the worker process to the executive process so that the executive process is able to function and such that the worker process is unable to function;
receiving the signal by the executive process; determining by the executive process whether the worker process is improperly functioning; and,
in response to determining that the worker process is improperly functioning, terminating the worker process by the executive process.

2. The method of claim 1, wherein the single-threaded, interrupt-free diagnostic mode is a polling-based firmware environment.

3. The method of claim 1, further comprising, otherwise, returning the processor control from the executive process to the worker process, such that the worker process is again able to function.

4. The method of claim 1, where sending the signal from the worker process to the executive process comprises calling an application program interface (API) of the executive process by the worker process.

5. The method of claim 1, further comprising, otherwise, incrementing a hardware heartbeat counter by the executive process for the worker process.

6. The method of claim 1, wherein determining by the executive process whether the worker process is improperly functioning comprises determining by the executive process whether the worker process is malfunctioning.

7. The method of claim 1, wherein determining by the executive process whether the worker process is improperly functioning comprises determining by the executive process whether the worker process is a malicious process.

8. A system comprising:
a processor;
a firmware environment having a single-threaded, interrupt-free diagnostic mode in which processes have complete processor control while running and such that other processes are unable to interrupt a running process and are unable to function unless and until the running process transfers processor control;
an executive process within the single-threaded, interrupt-free diagnostic mode of the firmware environment and having a heartbeat interface; and,
a worker process within the single-threaded, interrupt-free diagnostic mode of the firmware environment and periodically calling the heartbeat interface of the executive process for the executive process to determine whether the worker process is improperly functioning.

9. The system of claim 8, wherein the firmware environment has a hardware heartbeat counter incremented by the executive process in response to calls to the heartbeat interface of the executive process.

10. The system of claim 8, further comprising a processor, such that calling of the heartbeat interface of the executive process by the worker process results in control of the processor being transferred from the worker process to the executive process.

11. The system of claim 8, further comprising:
wherein the executive process receives control of the processor from the worker process upon the worker process calling the heartbeat interface of the executive process, the executive process terminating the worker process in response to determining that the worker process is improperly functioning and otherwise incrementing the hardware heartbeat counter of the operating environment and returning control of the processor to the worker process.

12. The system of claim 8, wherein the executive process terminates the worker process upon determining that the worker process is improperly functioning.

13. The system of claim 8, wherein the heartbeat interface comprises a heartbeat application programming interface (API).

14. An article comprising:
a computer-readable medium; and,
means in the medium for receiving a call to a heartbeat interface from a process within a single-threaded, interrupt-free diagnostic mode of a firmware environment such that processor control is received from the process and such that otherwise the process is unable to be interrupted, for terminating the process, in response to determining that the process is improperly functioning, and for returning the processor control back to the process in response to determining that the process is properly functioning.

15. The article of claim 14, wherein the means in the medium is further for incrementing a hardware heartbeat counter prior to returning the processor control back to the process in response to determining that the process is properly functioning.

16. The article of claim 14, wherein the means in the medium is further for determining whether the process is improperly functioning by determining whether the process is malfunctioning.

17. The article of claim 14, wherein the means in the medium is further for determining whether the process is improperly functioning by determining whether the process is a malicious process.

18. The article of claim 16, wherein the medium is one of a modulated carrier signal and a recordable data storage medium.

* * * * *